United States Patent
Kuroda et al.

(10) Patent No.: US 12,308,136 B2
(45) Date of Patent: May 20, 2025

(54) COPPER ALLOY WIRE, PLATED WIRE, ELECTRIC WIRE AND CABLE USING THESE

(71) Applicant: Hitachi Metals, Ltd., Tokyo (JP)

(72) Inventors: Hiromitsu Kuroda, Tokyo (JP); Takashi Hayasaka, Tokyo (JP); Detian Huang, Tokyo (JP); Ryohei Okada, Tokyo (JP); Tamotsu Sakurai, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/563,511

(22) Filed: Dec. 28, 2021

(65) Prior Publication Data
US 2022/0223313 A1    Jul. 14, 2022

(30) Foreign Application Priority Data

Jan. 14, 2021  (JP) .................................. 2021-003901
Jun. 17, 2021  (JP) .................................. 2021-100890

(51) Int. Cl.
- *H01B 1/02* (2006.01)
- *C22C 9/00* (2006.01)
- *H01B 7/18* (2006.01)

(52) U.S. Cl.
CPC ............... *H01B 1/026* (2013.01); *C22C 9/00* (2013.01); *H01B 7/18* (2013.01)

(58) Field of Classification Search
CPC .................................................... H01B 1/026
See application file for complete search history.

(56) References Cited

U.S. PATENT DOCUMENTS

| | | | | |
|---|---|---|---|---|
| 4,406,859 A | * | 9/1983 | Toda | C22C 9/06 420/487 |
| 5,077,005 A | * | 12/1991 | Kato | H01B 1/026 420/500 |
| 5,124,124 A | * | 6/1992 | Ohashi | C22C 9/06 420/476 |
| 6,627,009 B1 | * | 9/2003 | Matsui | C22C 9/00 148/436 |
| 11,404,181 B2 | * | 8/2022 | Kuroda | H01B 1/026 |
| 2003/0108766 A1 | * | 6/2003 | Nagai | H05K 1/09 428/673 |
| 2007/0187134 A1 | * | 8/2007 | Detian | H01B 11/20 174/126.1 |

(Continued)

FOREIGN PATENT DOCUMENTS

| CN | 105745340 A | 7/2016 |
|---|---|---|
| CN | 107532238 A | 1/2018 |

(Continued)

OTHER PUBLICATIONS

Chinese Office Action, dated Jul. 5, 2024 in Chinese Application No. 202111617195.0 and English Translation thereof.

(Continued)

*Primary Examiner* — Chau N Nguyen
(74) *Attorney, Agent, or Firm* — MCGINN I.P. LAW GROUP, PLLC

(57) ABSTRACT

A copper alloy wire is composed of a copper alloy including indium of 0.3 mass % or more and 0.65 mass % or less, and has 0.2% proof stress of 300 MPa or more, electrical conductivity of 80% IACS or more, and elongation of 7% or more.

16 Claims, 4 Drawing Sheets

10 COPPER ALLOY WIRE
11 COPPER ALLOY

(56) References Cited

U.S. PATENT DOCUMENTS

| | | | | |
|---|---|---|---|---|
| 2012/0018192 A1* | 1/2012 | Takahashi | ................ | C22C 9/04 174/128.1 |
| 2016/0284437 A1 | 9/2016 | Inoue et al. | | |
| 2018/0102199 A1 | 4/2018 | Uegaki et al. | | |
| 2020/0373272 A1* | 11/2020 | Yuan | ........................ | C22C 9/00 |

FOREIGN PATENT DOCUMENTS

| | | | |
|---|---|---|---|
| EP | 2 868 758 A1 | | 5/2015 |
| JP | H05-311285 A | | 11/1993 |
| JP | 2002-129262 | * | 5/2002 |
| JP | 2006-307307 A | | 11/2006 |
| JP | 2014-159609 A | | 9/2014 |
| JP | 2015-004118 A | | 1/2015 |
| WO | WO 2014-007259 | | 1/2014 |

OTHER PUBLICATIONS

Japanese Office Action for Japanese Application No. 2021-100890 dated Jan. 7, 2025, with English language translation.

* cited by examiner

10 COPPER ALLOY WIRE
11 COPPER ALLOY

COPPER ALLOY WIRE, PLATED WIRE, ELECTRIC WIRE AND CABLE USING THESE

CROSS-REFERENCE TO RELATED APPLICATIONS

The present patent application claims the priority of Japanese patent application No. 2021-3901 filed on Jan. 14, 2021 and the priority of Japanese patent application No. 2021-100890 filed on Jun. 17, 2021, and the entire contents thereof are hereby incorporated by reference.

TECHNICAL FIELD

The invention relates to a copper alloy wire, a plated wire, an electric wire using the same, and a cable using the same.

BACKGROUND ART

Patent Literature 1 (JPH05-311285A) describes a copper alloy wire which contains indium and tin in addition to copper. Patent Literature 2 (JP2014-159609A) describes a copper alloy which contains 0.01% atomic percent or more of at least one element selected from the group consisting of Ag, In, Mg, and Sn, as a copper alloy before wire-drawing. Patent Literature 3 (WO2014/007259) describes that in manufacturing process of a copper alloy material, intermediate heat treatment is performed between cold working which is performed multiple times. Patent Literature 4 (JP2015-4118A) describes that in manufacturing process of copper wire drawing, a wire is annealed after drawn, and then redrawn as the final step.

PRIOR ART DOCUMENTS

Patent Literatures

Patent Literature 1: JPH05-311285A
Patent Literature 2: JP2014-159609A
Patent Literature 3: WO02014/007259
Patent Literature 4: JP2015-4118A

SUMMARY OF THE INVENTION

Metal wires made of copper alloy are used for various applications. For example, metal wires made of copper alloy are used as conductors for electric wires and cables that are wired inside electronic devices, industrial robots, vehicles, and the like, as internal wiring parts. Metal wires used for such an application are required to have enhanced strength and electrical conductivity in order to improve bending life and transmission properties of electric wires and cables.

The object of the present invention is to provide technology to enhance both strength and electrical conductivity of metal wires.

So as to achieve the above objection, one aspect of the present invention provides a copper alloy wire, comprising:
 a copper alloy including indium of 0.3 mass % or more and 0.65 mass % or less;
 wherein the copper alloy wire comprises 0.2% proof stress of 300 MPa or more, electrical conductivity of 80% IACS or more, and elongation of 7% or more.

For example, the copper alloy may include tin of 0.02 mass % or more and less than 0.1 mass %, and wherein a total content rate of indium and tin is preferably 0.65 mass % or less.

Another aspect of the present invention provides an electric wire, comprising:
 a conductor; and
 an insulation coating an outer periphery of the conductor;
 wherein the conductor comprises a copper alloy wire comprising a copper alloy including indium of 0.3 mass % or more and 0.65 mass % or less,
 wherein the copper alloy wire comprises 0.2% proof stress of 300 MPa or more, electrical conductivity of 80% IACS or more, and elongation of 7% or more.

For example, the copper alloy in the electric wire may include tin of 0.02 mass % or more and less than 0.1 mass %, and a total content rate of indium and tin is preferably 0.65 mass % or less.

For example, the conductor preferably comprises a plurality of the copper alloy wires being stranded together.

A still another aspect of the present invention provides a plated wire, comprising:
 a copper alloy wire comprising a copper alloy including indium of 0.3 mass % or more and 0.65 mass % or less; and
 a plating layer formed on an outer periphery of the copper alloy wire;
 wherein the plated wire comprises 0.2% proof stress of 300 MPa or more, electrical conductivity of 80% IACS or more, and elongation of 7% or more.

A further aspect of the present invention provides a cable, comprising:
 a plurality of core wires each comprising an electric wire including a conductor and an insulation coating an outer periphery of the conductor; and
 a sheath covering the plurality of core wires collectively,
 wherein the conductor comprises a copper alloy wire comprising a copper alloy including indium of 0.3 mass % or more and 0.65 mass % or less, and
 wherein the copper alloy wire comprises 0.2% proof stress of 300 MPa or more, electrical conductivity of 80% IACS or more, and elongation of 7% or more.

For example, the copper alloy in the cable may include tin of 0.02 mass % or more and less than 0.1 mass %, and a total content rate of indium and tin is preferably 0.65 mass % or less.

Effect of the Invention

According to a main embodiment of the present invention, it is possible to improve both strength and electrical conductivity of metal wires.

BEST MODE FOR CARRYING OUT THE INVENTION

An embodiment of the present invention will be explained below in conjunction with appended drawings. In the description below, a metal wire made of copper alloy with a diameter (external diameter) of 100 μm or less is called "copper alloy wire." Also, a copper alloy wire before wire drawing process is called a "wire rod." Additionally, a copper alloy wire (metal wire) which has a plating layer on an outer periphery is called a "plated wire."

Additionally, in the description below, an index called IACS (International Annealed Copper Standard) is used for evaluation of electrical conductivity. To evaluate electrical conductivity in IACS, the electrical conductivity of annealed standard soft copper (Volume resistivity: $1.7241 \times 10^{-2}$ μΩm) is defined as 100% IACS, and the electrical conductivity ratio of a material relative to the annealed standard soft copper is expressed as "XX % IACS," The electrical conductivity described below is calculated based on measured results of electric resistance and a diameter of a test piece after performing measurements according to test methods of electric copper wire defined by Japanese Industrial Standards (JIS C 3002: 1992).

Additionally, in the description below, when explaining "elongation" of a metal wire or a plated wire, a tensile test is performed according to a test method of electric copper wire defined by Japanese Industrial Standards (JIS C 3002: 1992) and a value calculated from the measurement results is "elongation." Furthermore, in the description below, when explaining "0.2% proof stress" of a metal wire or a plated wire, a tensile test is performed on a test piece according to a test method of metal materials defined by Japanese Industrial Standards (JIS Z 2241: 2011) and a value calculated from the measured results is "0.2% proof stress."

Knowledge Newly Discovered by the Present Inventors

For example, electric wires and cables are used as internal wiring parts inside the industrial robots installed in a plant or the like. The wires and cables used for such an application, need a longer bending life and improved transmission properties. The present inventors achieved the present invention by discovering a solution for the problem of improving the bending life and the transmission properties of electric wires and cables by improving 0.2 proof stress which is one of indexes of strength of metal wires and plated wires used for conductors of electric wires and cables as well as electrical conductivity which has been a trade-off for improving 0.2 proof stress.

<Structure of Metal Wires>

Figure 1:
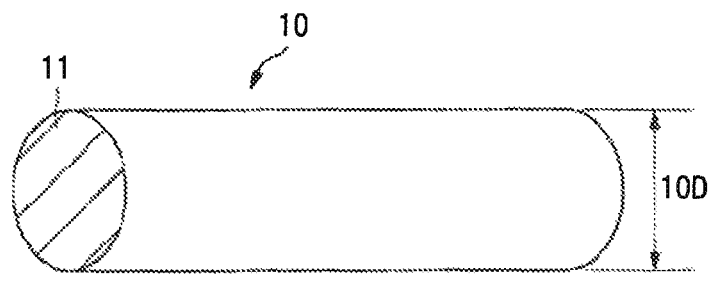
FIG. 1 is a perspective cross-sectional view of a metal wire in an embodiment of the present invention.

FIG. 1 is a perspective cross-sectional view of a metal wire related to the present embodiment. A copper alloy wire 10 in FIG. 1 is a copper alloy wire made of a copper alloy 11 which contains indium (In) of 0.3 mass % or more and 0.65 mass % or less. The copper alloy 11 contains unavoidable impurities in the balance. Also, 0.2% proof stress of the copper alloy wire 10 is 300 MPa or more (preferably, 300 MPa or more and 350 MPa or less), the electrical conductivity of the copper alloy wire 10 is 80% IACS or more (preferably, 80% IACS or more and 90% IACS or less), and the elongation of the copper alloy 10 is 7% or more (preferably, 7% or more and 18% or less).

As unavoidable impurities contained in the copper alloy 11 are e.g., aluminum (Al), silicon (Si), phosphorus (P), sulfur (S), chrome (Cr), iron (Fe), nickel (Ni), arsenic (As), selenium (Se), silver (Ag), antimony (Sb), lead (Pb), or bismuth (Bi). The unavoidable impurities in the copper alloy 11 are contained, e.g., in the range of 20 mass ppm or more and 30 mass ppm or less.

The above-mentioned copper alloy wire 10 including the copper alloy 11 can achieve both 0.2% proof stress and electrical conductivity at high level. The details will be explained below as an embodiment, but the present inventor confirmed that the copper alloy wire 10 that comprises the copper alloy 11 including 0.3 mass % or more and 0.65 mass % or less of indium (In), and the balance composed of copper (Cu) and unavoidable impure substances, has the electrical conductivity of 80% IACS or more and 0.2% proof stress of 300 MPa or more.

A conductive wire that transmits electricity (hereinafter, simply referred to as "electric wire") is a material that configures a transmission path of electricity or a transmission path of electric signals, and is widely used in various fields. As a conductor in an electric wire, conductive materials such as various pure metals, alloys, or composite materials are used. In the present embodiment, the copper alloy wire 10 composed of the copper alloy 11 having high electrical conductivity is explained as a conductor for an electric wire.

A copper wire used as a conductor in an electric wire is used in various fields as mentioned above, but a copper wire with a small diameter is required in some fields. For example, in electronic devices such as mobile equipment, electric wires with conductors made of copper wires are used as internal wiring parts. In some cases, a diameter of a copper wire is required to be 100 μm or less. Also, some probe cables used in the medical field are inserted into a patient's body, so a copper wire with even smaller diameter is required. In the present embodiment, the copper alloy wire 10 with a diameter 10D of 80 μm is explained as an example of extremely fine wire.

0.2% proof stress of the copper alloy wire 10 composed of the copper alloy 11 can be improved by generating a distortion on the copper alloy 11. To generate a distortion on the copper alloy 11, there are a method by increasing the content rate of metals other than copper contained in the copper alloy 11 and a method by performing wire drawing. However, when a distortion is generated on the copper alloy wire 10 by these methods, the resistivity of the copper alloy 11 as an electrically conductive material increases, and thus, the electrical conductivity of the copper alloy wire 10 decreases. In other words, increasing the 0.2% proof stress of the copper alloy wire 10 and increasing the electrical conductivity of the copper alloy wire 10 are in a trade-off relationship.

Therefore, the present inventors focused on the influence of multiple metallic elements on decrease in the electrical conductivity and contribution to improving the 0.2% proof stress of the copper alloy 11, in order to find out a composition that improves the properties of electrical conductivity and 0.2 proof stress of the solid-solution strengthened copper alloy 11. In other words, the contribution to improving the 0.2 proof stress of the copper alloy wire 10 varies depending on metallic elements, and when the content rate of a metallic element in copper solid solution becomes larger, the 0.2 proof stress becomes bigger proportionately. Compared with metals such as aluminum (Al), nickel (Ni), or magnesium (Mg), tin (Sn) and indium (In) are effectual additive elements, since they have a big impact on increasing 0.2% proof stress when they are added to copper in solid solution.

On the other hand, a degree of impact on decrease in electrical conductivity varies substantially depending on metallic elements. More specifically, when silver (Ag), indium (In), or magnesium (Mg) is added, a decrease in electrical conductivity can be controlled even if their concentration in the copper solid solution increases, in comparison with metals such as nickel (Ni), tin (Sn), or aluminum (Al). For example, in a condition where the concentration (mass concentration) of the above-mentioned metallic elements added to an oxygen-free copper is 900 ppm, addition of tin (Sn) decreases the electrical conductivity to 92% while that of indium (In) decreases it to 98%, when the electrical conductivity of pure copper is 100% (percentage). Also, when silver (Ag) is added, the electrical conductivity decreases only to 99%, when the electrical conductivity of pure copper is 100% (percentage).

Considering the above properties, the copper alloy 11 made by adding indium to the copper solid solution has properties of electrical conductivity and 0.2% proof stress at high level. Also, if using a copper alloy including silver (Ag) in the solid solution, even higher electrical conductivity than that of the copper alloy wire 10 in the present embodiment can be achieved. However, silver has a smaller effect to increase 0.2% proof stress compared with indium, if the concentration of the two metals is the same. If the content of silver increases, the raw material cost of the copper alloy wire 10 increases, so it is preferable to add indium to the solid solution.

Additionally, it is preferable that the content rate of oxygen in a copper alloy is small to improve the 0.2% proof stress of the copper alloy 11. In the present embodiment, the oxygen contained in the copper alloy 11 is 0.002 mass % or less. If the oxygen contained in the copper alloy 11 is 0.002 mass % or less, a decrease of the 0.2% proof stress of the copper alloy 11 due to oxygen can be controlled.

As a variation example of the copper alloy wire 10 shown in FIG. 1, the copper alloy 11 may contain indium (In) of 0.3 mass % or more and less than 0.65 mass % and tin (Sn) of 0.02 mass % or more and less than 0.1 mass %, and the balance may be composed of copper (Cu) and unavoidable impurities. However, the total content rate of indium and tin contained in the copper alloy 11 is 0.65 mass % or less.

In a variation example of the copper alloy wire 10, the copper alloy 11 contains tin in the solid solution, so compared with the copper alloy wire 10 including no tin (being free of tin, Sn-free), the electrical conductivity is relatively low. However, if the content rate of tin is less than 0.1 mass % and that of indium 0.3 mass % or more, electrical conductivity of 80% IACS or more can be maintained. It is preferable that the total content rate of indium and tin contained in the copper alloy 11 is 0.65 mass % or less. In this way, by adding tin to a solid solution in a predetermined content amount, use of a variation of the copper alloy wire 10 can maintain the electrical conductivity of 80% IACS or more and decrease the raw material cost of the copper alloy wire 10 at the same time.

<Manufacturing Method of the Metal Wire>

Figure 2:
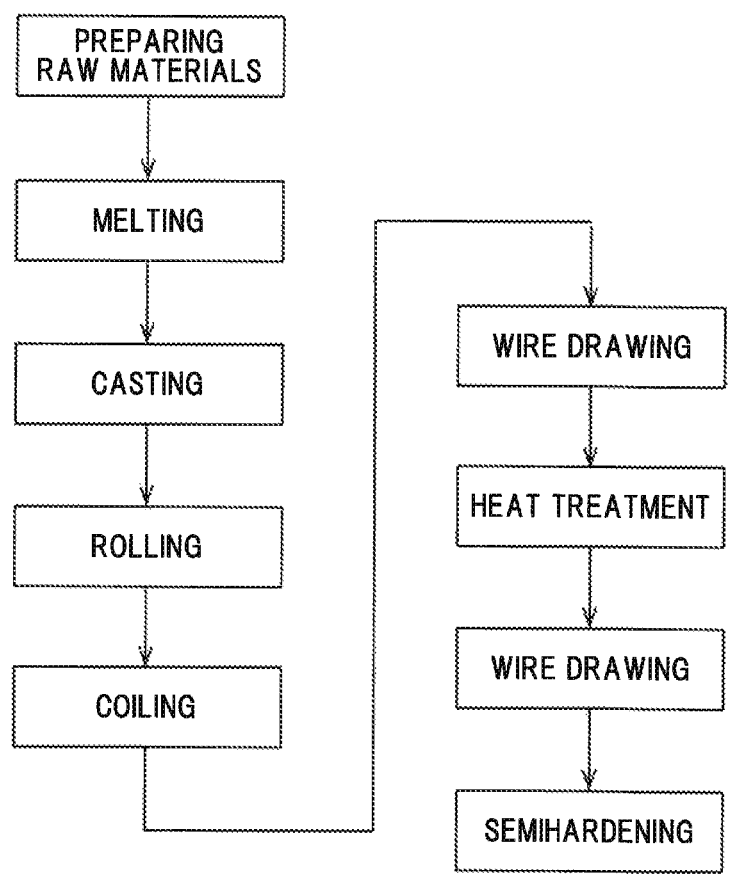
FIG. 2 is a flow chart showing an example of a manufacturing process of the metal wire illustrated in FIG. 1.

Next, the manufacturing method of the copper alloy wire 10 will be explained. The above-mentioned copper alloy wire 10 has a type including tin and a type not including tin, but their manufacturing methods are the same. FIG. 2 is a flow chart showing an example of manufacturing process of the metal wire in FIG. 1.

As a manufacturing method of a metal wire, a method by drawing a wire rod after manufacturing the wire rod with some largeness of diameter (e.g., 8 to 12 mm) by continuous casting and rolling will be explained below. For continuous casting and rolling, e.g., a method called SCR (Southwire Continuous Rod system) can be used.

First, raw material(s) are prepared as a process of preparing raw material(s) shown in FIG. 2. The raw material(s) are metals mainly made of copper. The raw material(s), as mentioned above, may contain impurities other than copper, which mixed in copper unavoidably. The raw material(s) also contain additive elements including indium. Additionally, in a manufacturing method of a metal wire explained as a variation of the copper alloy wire 10 in FIG. 1, additive elements are indium and tin. These additive elements are added to raw material(s) which are composed mainly of copper, within the range where the above-mentioned conditions of content rates are met.

Next, as a melting process shown in FIG. 2, the raw material(s) are melted inside a melting furnace (not shown). The melting furnace is a furnace that can melt raw material(s) continuously, and copper melted inside the melting furnace is moved sequentially to a holding furnace (not shown).

Next, as a casting process shown in FIG. 2, after molten copper is poured into a casting mold which is not shown in the chart, it becomes solid when cooled down. Then the solid casting is removed from the casting mold, and is moved to a rolling machine sequentially. From the melting process to the casting process, the operation is done in an atmosphere of inert gas (e.g., in an atmosphere of nitrogen). Very little oxygen exists in the atmosphere of inert gas, so the concentration (volume concentration) of oxygen is at least 10 ppm or less. By manufacturing a wire rod in the atmosphere of inert gas with very low concentration of oxygen as explained above, oxygen's getting into copper during the casting process can be controlled.

Next, as a rolling process shown FIG. 2, the casting is rolled on and made into a wire rod with a diameter of 8 to 12 mm approximately. In the rolling process, some cases need a rolling operation for multiple times. To use the casting made in the casting process as a wire rod, the rolling process here can be omitted. Also, a wire rod of which the surface is purified by oxygen removal treatment or the like after rolling is also useful.

Next, as a coiling process shown in FIG. 2, a roll of a wire rod is made by coiling a wire rod by coiling machine which is not shown in the chart. Also, a wire rod coiled by the coiling machine has 0.2% proof stress of 50 MPa or more and 150 MPa or less approximately, and electrical conductivity of above 85% IACS and 95% IACS or less approximately.

Next, as a wire drawing process shown in FIG. 2, a wire rod is drawn until its diameter becomes 100 µm or less (e.g., 50 to 80 µm approximately) to make it a drawn wire of hard material. The wire drawing process is performed as what we call "cold working" at room temperature (e.g., 25° C.). During the wire drawing process, a wire rod is drawn in a rolling direction, and wire drawing is performed for multiple times (first wire drawing and second wire drawing), as heat treatment process (also called "annealing process") between the wire drawing processes, heat treatment is performed on a drawn wire material under wire drawing process. Additionally, in the first wire drawing process, it is preferable to draw a wire rod (e.g., diameter of 8 to 12 µm approximately) up to a desired diameter (e.g., diameter of 0.5 or more to 3.0 mm or less approximately) by one wire drawing.

During the wire drawing process, since a metal wire is distorted, the 0.2% proof stress of the metal wire can be improved, but the electrical conductivity of the metal wire decreases. If heat treatment is performed during the wire drawing process, distortion in a metal wire is reduced. Therefore, a metal wire after heat treatment has lower 0.2% proof stress, but higher electrical conductivity. According to the present inventor, by performing heat treatment during the wire drawing process (between the first wire drawing and second wire drawing) so as to meet the conditions below, a semi-hardened (half-hardened) metal wire which can be obtained finally (copper alloy 10) can maintain 0.2% proof stress and electrical conductivity at high level. Additionally, the semi-hardened copper alloy wire mentioned here is a metal wire with elongation of 7% or more and 18% or less.

When 0.2% proof stress of a metal wire before heat treatment (after wire drawing process just before heat treatment) is A, and 0.2% proof stress of a metal wire after heat treatment (right after heat treatment) is B, a ratio C of the 0.2% proof stress values is calculated by an equation C=B/A. Heat treatment is performed so that the ratio C of the 0.2% proof stress values becomes 0.5 or more and 0.8 or less. Also, when elongation of a metal wire before heat treatment (after wire drawing process just before heat treatment) is D, and elongation of a metal wire after heat treatment (right after heat treatment) is E, a ratio F of the elongation values is calculated by an equation F=E/D. Heat treatment is performed so that the ratio F of the elongation values becomes 10 or more and 50 or less. Also, as shown in FIG. 2, to perform wire drawing again after heat treatment, it is preferable to perform heat treatment so that the electrical conductivity of a metal wire right after heat treatment is 86% IACS or more (preferably, 88% IACS or more). Additionally, it is preferable that 0.2% proof stress of a metal wire right after heat treatment is 60 MPa or more and 200 MPa or less, and elongation of a metal wire right after heat treatment is 20% or more and 40% or less. By doing the above, the electrical conductivity after wire drawing (the second wire drawing process) following heat treatment can be 80% IACS or more. In the above-mentioned heat treatment, e.g., it is preferable to perform heat treatment at the temperature of 400° C. or more and 900° C. or less.

Also, in FIG. 2, an embodiment is explained as follows; after drawing a wire rod up to a desired diameter (e.g., diameter of 0.5 mm or more and 3.0 mm or less) in the wire drawing process (the first wire drawing process), heat treatment is performed on the drawn wire material under the above-mentioned conditions in the heat treatment process, and perform further wire drawing (the second wire drawing process) so that the wire material will have a desired diameter (e.g., diameter of 0.1 mm or less), however, some variations can be applied. For example, the second wire drawing process consists of multiple wire drawing operations, so the wire material can be drawn step by step until it comes to have a desired diameter. In the second wire drawing process, by drawing the wire material step by step in multiple wire drawing operations, the above-mentioned hard material can be produced stably, compared with a case where the second wire drawing process has only one wire drawing operation. When the second wire drawing process consists of multiple wire drawing operations, the above-mentioned heat treatment process can be performed between the multiple wire drawing operations as necessary. The hard drawn wire material mentioned here is a metal wire which has elongation of 0.5% or more and 3% or less and a diameter of 100 μm or less.

Next, semi-hardening treatment is performed on the hard drawn wire material with a diameter of 100 μm or less which was made by the wire drawing process. By performing the semi-hardening treatment on the hard drawn wire material, a semi-hardened metal wire (copper alloy 10) is made. As the semi-hardening treatment, it is preferable to apply heat to the hard drawn wire material made by the wire drawing process under the heating conditions, e.g., heat temperature of 520° C. or more and 580° C. or less, heating time of 0.3 sec or more and 0.8 sec or less. By doing this, the copper alloy 10 with 0.2% proof stress of 300 MPa or more and 350 MPa or less, electrical conductivity of 80% IACS or more and 90% IACS or less, elongation of 7% or more and 18% or less, and a diameter of 100 μm or less can be obtained.

<Evaluation of Alloy Composition and Properties>

Next, the experiment results will be explained about the relationship between alloy composition and properties that the copper alloy 10 in FIG. 1 has. Table 1 shows the relationship between alloy composition and properties that the copper alloy 10 has.

TABLE 1

| Sample No. | Alloy Composition (mass %) | | Properties | | | | Semi-hardening Treatment | |
|---|---|---|---|---|---|---|---|---|
| | Sn | In | 0.2% Proof Stress (MPa) | Electrical Conductivity (% IACS) | Elongation (%) | Bending Life (times) | Temperature (° C.) | Time (sec) |
| 1 | 0 | 0.30 | 326 | 88.8 | 11.0 | 3102 | 550 | 0.50 |
| 2 | 0 | 0.35 | 328 | 87.1 | 12.2 | 3155 | 560 | 0.52 |
| 3 | 0.05 | 0.30 | 330 | 84.7 | 13.2 | 3185 | 560 | 0.52 |
| 4 | 0.05 | 0.30 | 345 | 83.0 | 5.0 | 2329 | 500 | 0.52 |
| 5 | 0.05 | 0.30 | 254 | 87.8 | 14.8 | 1400 | 600 | 0.52 |
| 6 | 0.05 | 0.30 | 342 | 83.6 | 4.3 | 2256 | 560 | 0.10 |
| 7 | 0.05 | 0.30 | 279 | 88.2 | 17.3 | 1653 | 560 | 1.00 |

In Table 1, Samples No. 1 to 3 are Examples that meet the above-mentioned conditions of the copper alloy wire 10, and Samples No. 4 to 7 are comparative examples that do not meet the above-mentioned conditions of the copper alloy wire 10. Each of Samples No. 1 to 7 was manufactured by the manufacturing processes explained using FIG. 2. Also, the samples provided for the 0.2% proof stress test and the elongation test in Table 1 are metal wires that were processed to have a diameter of 80 μm. The tensile speed to measure elongation was 50 mm/min, and the gauge length was 250 mm. 0.2% proof stress was measured by a tensile test compliant with JIS Z2241. In more concrete terms, 0.2% proof stress was measured by the above-mentioned tensile test (offset method, gauge length: 250 mm, tensile speed: 50 mm/min). The cross-section area of each sample was calculated from a diameter measured by micrometer up to 1/1000 mm, as a cross-section area of a perfect circle. The elongation value is total elongation at break (sum of elastic elongation and plastic elongation of extensometer) and is expressed by percentage to gauge length of the extensometer. Also, it is not described in Table 1, but each of Samples No. 1 to 7 was processed under the environment where oxygen could be hardly mixed in, and thus, the oxygen content in copper alloy of each sample is 0.002 mass % or less.

In Table 1, bending life was measured by attaching a weight of 20 g to a sample, bending the sample at 90 degrees right and left supporting by the jig with a bending radius of 5 mm, and counted bending times until the sample broke. A set of right and left operations at 90 degrees was counted as one bending.

In Table 1, as you can see from Samples 1 and 2, when only indium is added to copper alloy, under the conditions where the content rate of indium is 0.30 mass % or more, 0.2% proof stress of the samples is 300 MPa or more, and elongation is 7% or more, a good bending life (bending times of 3000 times or more) can be obtained.

Also, in Table 1, as you can see from the comparison of Samples 3 to 7, when indium and tin are added to copper alloy, under the conditions where the content rate of indium is 0.30 mass % or more and less than 0.65 mass %, the content rate of tin is 0.02 mass % or more and less than 0.1 mass %, 0.2% proof stress of the samples is 300 MPa or more, and elongation is 7% or more, a good bending life (bending times of 3000 times or more) can be obtained.

Application Example of Copper Alloy

Figure 3:
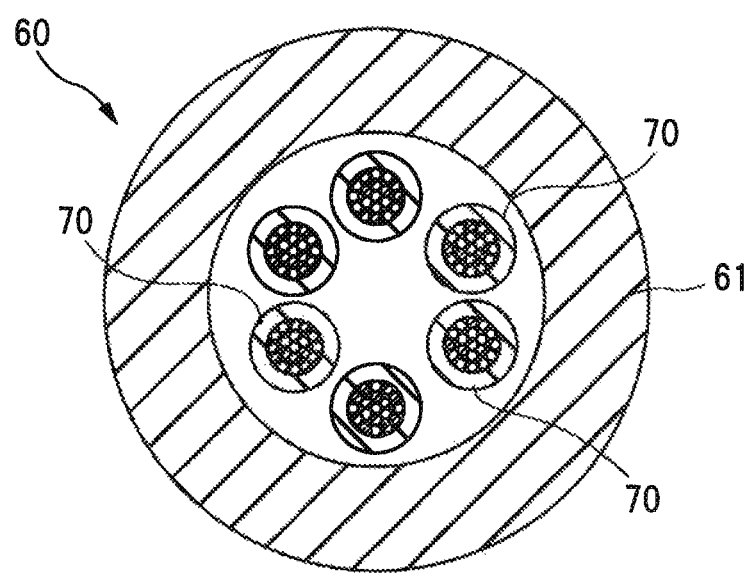
FIG. 3 is a cross-sectional view of a cable including the metal wires illustrated in FIG. 1.
Figure 4:
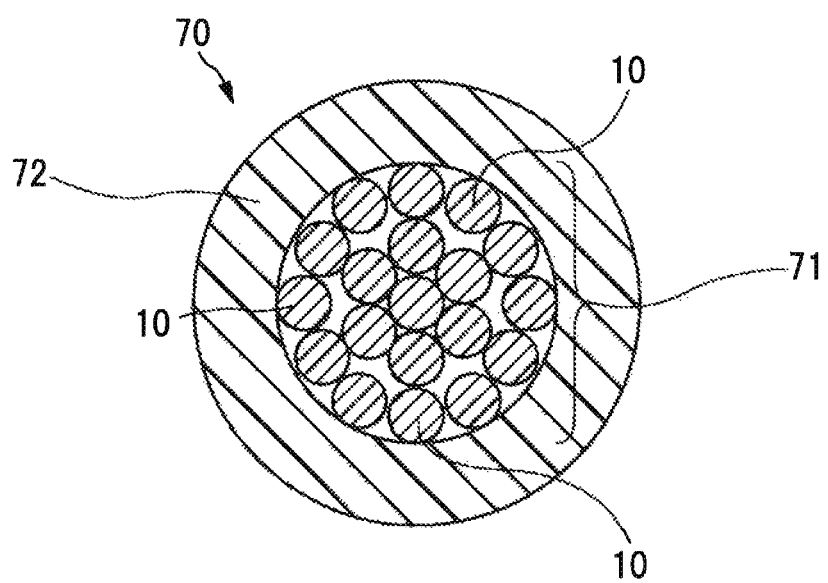
FIG. 4 is a cross-sectional view of one of multiple electric wires in the cable illustrated in FIG. 3.

Next, an application example of the copper alloy wire 10 in FIG. 1 will be explained. FIG. 3 is a cross-sectional view of a cable including the copper alloy wire 10 in FIG. 1. FIG. 4 is a cross-sectional view of one of multiple electric wires that the cable in FIG. 3 has.

A cable 60 in FIG. 3 has multiple electric wires (core wires) 70 and a sheath 61 which covers around the multiple electric wires 70 collectively. An interposition which is not illustrated in the figure is placed around each of the multiple electric wires 70, and the interposition separates the multiple electric wires 70 from one another. The interposition is, e.g., made of linear member composed of tissue or resin. The sheath 61 is, e.g., composed of resin composition or fluorine resin whose chief component (base resin) is resin such as chlorinated polyethylene or polyvinyl chloride. The multiple electric wires 70 can contact one another. The cable 60 is a cable used for, e.g., mobile electronic devices such as smartphones or the like, industrial robots installed inside a plant or the like, or internal wiring inside vehicles. The cable 60 has the multiple electric wires 70 and each of the multiple electric wires 70 has a small outer diameter. For example, in the examples in FIG. 3 and FIG. 4, an outer diameter of the electric wire 70 is approximately 0.86 mm (860 µm).

As shown in FIG. 4, the electric wire 70 has a center conductor 71 composed of the multiple copper alloy wires 10 stranded together and an insulator 72 that covers around the center conductor 71. Each of the multiple copper alloy wires 10 composing the center conductor 71 is made of the copper alloy 11 which was explained using FIG. 1. In other words, the copper alloy 11 that composes the copper alloy wire 10 contains indium of 0.3 mass % or more and 0.65 mass % or less. A diameter of each of the multiple copper alloy wires 10 is, e.g., 0.08 mm (80 µm). The insulator 72 is e.g., made of resin or fluorine resin such as polyethylene or polypropylene.

As explained above, the electric wire 70 having the multiple copper alloy wires 10 and the cable 60 using these can improve electric signals in mobile electronic devices or transmission properties of power source. Since the electric wire 70 having the extremely fine multiple copper alloy wires 10 and the cable 60 using these can have a reduced diameter, mainframes of mobile electronic devices or industrial robots can be downsized as well.

Additionally, the electric wire 70 is shown as an example in FIG. 4, but an electric wire using the copper alloy wire 10 in FIG. 1 has some variations. For example, an electric wire having a conductor made of one copper alloy wire 10 and an insulator covering around the conductor can be made. Also, in FIG. 3 and FIG. 4, the stranded multiple copper alloy wires 10 are shown as an example as the center conductor 71 of the electric wire 70, but it is not limited to thereto, the center conductor 71 made of plated wire(s) described below can be used as well.

<Plated Wires>

A plated wire is composed of the copper alloy wire 10 in FIG. 1 which has a plating layer around (on outer surface). The plated wire has 0.2 proof stress of 300 MPa or more, electrical conductivity of 80% IACS or more, and elongation of 7% or more. In other words, the plated wire has 0.2 proof stress of 300 MPa or more (preferably, 300 MPa or more and 340 MPa or less), electrical conductivity of 80% IACS or more (preferably, 80% IACS or more and 89% IACS or less), and elongation of 7% or more (preferably, 7% or more and 18% or less) under the condition where the copper alloy wire in FIG. 1 has a plating layer around. Additionally, a plated wire is a semi-hard linear member.

The copper alloy wire is, as described above, made of copper alloy including indium (In) of 0.3 mass % or more and 0.65 mass % or less. Especially, it is preferable that the copper alloy wire contains indium (In) of 0.3 mass % or more and 0.65 mass % or less, while the rest is composed of copper alloy made of copper (Cu) and unavoidable impurities. It is also acceptable that the copper alloy wire contains indium (In) of 0.3 mass % or more and 0.65 mass % or less and tin (Sn) of 0.02 mass % or more and 0.1 mass % or less, while the rest is composed of copper (Cu) and unavoidable impurities. In this case, the total content rate of indium and tin in the copper alloy is 0.65 mass % or less.

The plating layer is configured around the copper alloy and in contact with the surface of the copper alloy. The thickness of the plating layer is, e.g., 0.1 µm or more and 1.5 µm or less. The plating layer is, e.g., composed of tin (Sn), silver (Ag), and nickel (Ni) or the like.

<Manufacturing Method of Plated Wire>

A plated wire can be made by forming a plating layer on a copper alloy wire manufactured by the manufacturing method of copper alloy wire in FIG. 2. A copper alloy wire before a plating layer is formed is a semi-hardened metal wire which has 0.2% proof stress of 300 MPa or more and electrical conductivity of 80% IACS or more. The copper alloy wire is soaked in a plating bath where a molten plating material (e.g., Sn) is pooled at predetermined temperature (e.g., 250° C. or more and 300° C. or less). In this way, the entire outer surface of the copper alloy wire is hot-dip plated. After that, by passing the hot-dip plated copper alloy wire through a coating die (plating die), the thickness of the hot-dip plating on the copper alloy wire is adjusted to make a plating layer of predetermined thickness. Especially, as conditions to apply hot-dip plating on a copper alloy wire, it is preferable to perform with linear speed of 100 m/min or more and soaking time of hot-dip plating of 0.1 sec or more and 1.0 sec or less. The copper alloy wire where a plating layer is formed in this manner, maintains its semi-hard condition and its elongation as a plated wire is 7% or more and 18% or less.

<Properties of Plated Wire>

Next, experimental results on properties that a plated wire has will be explained. FIG. 2 and FIG. 3 show the relationship between alloy composition of copper alloy wire which makes a plated wire and properties of plated wire.

TABLE 2

| Sample No. | Alloy Composition (mass %) | | Properties | | | Bending Life (times) | Semi-hardening Treatment | |
|---|---|---|---|---|---|---|---|---|
| | Sn | In | 0.2% Proof Stress (MPa) | Electrical Conductivity (% IACS) | Elongation (%) | | Temperature (° C.) | Time (sec) |
| 8 | 0.05 | 0.30 | 325 | 83.5 | 13.0 | 3356 | 560 | 0.52 |
| 9 | 0.05 | 0.30 | 340 | 82.0 | 5.3 | 2645 | 500 | 0.52 |
| 10 | 0.05 | 0.30 | 242 | 86.2 | 13.6 | 1598 | 600 | 0.52 |
| 11 | 0.05 | 0.30 | 331 | 81.8 | 5.2 | 2428 | 560 | 0.10 |
| 12 | 0.05 | 0.30 | 269 | 87.3 | 18.6 | 1578 | 560 | 1.00 |

TABLE 3

| Sample No. | Alloy Composition (mass %) | | Properties | | | Bending Life (times) | Semi-hardening Treatment | |
|---|---|---|---|---|---|---|---|---|
| | Sn | In | 0.2% Proof Stress (MPa) | Electrical Conductivity (% IACS) | Elongation (%) | | Temperature (° C.) | Time (sec) |
| 13 | 0 | 0.35 | 325 | 87.2 | 11.8 | 3211 | 560 | 0.52 |
| 14 | 0 | 0.35 | 338 | 87.1 | 8.3 | 3482 | 560 | 0.41 |
| 15 | 0 | 0.35 | 380 | 86.2 | 2.1 | 2723 | 560 | 0.20 |
| 16 | 0 | 0.35 | 271 | 87.5 | 16.0 | 1856 | 560 | 0.90 |

In Table 2 and Table 3, Samples No. 8, No. 13, and No. 14 are Examples that meet the above-mentioned conditions of a plated wire, while Samples No. 9 to 12, No. 15, and No. 16 are comparative examples that do not meet the above-mentioned conditions of a plated wire. Each of Samples No. 8 to 12 in Table 2 and Samples No. 13 to 16 in Table 3 are copper wires manufactured by the manufacturing process explained using FIG. 2, on which plating layers are formed. In concrete terms, copper alloy wires manufactured by the manufacturing process explained using FIG. 2 were soaked in a plating tank where a molten Sn is pooled (temperature: 250° C. or more and 300° C. or less). After that, by passing the hot-dip plated copper alloy wire through a coating die, the thickness of the hot-dip plating on the copper alloy wire was adjusted to make a plating layer of predetermined thickness. Additionally, in Table 2 and Table 3, samples used for 0.2% proof stress test and elongation test are copper alloy wires processed to have a diameter of approximately 80 μm, around which plating layers are formed (thickness: approximately 0.5 μm). The copper alloy wires used as Samples No. 8 to 16 are made of copper alloy which contains indium (In) and tin (Sn) at the content rate shown in Table 2 and Table 3, and copper and unavoidable impure substance as the rest. Also, the tensile speed to measure elongation was 50 mm/min and gauge length is 250 mm. 0.2% proof stress was measured by a tensile test compliant with JIS Z2241, In more concrete terms, 0.2% proof stress was measured by the above tensile test (offset method, gauge length: 250 mm, tensile speed: 50 m/min). The cross-section area of each sample was calculated from a diameter measured by micrometer up to $1/1000$ mm, as a cross-section area of a perfect circle. The elongation value is total elongation at break (sum of elastic elongation and plastic elongation of extensometer) and is expressed by percentage to gauge length of the extensometer. Also, it is not described in Table 2 and Table 3, but each of Samples No. 8 to 16 was processed under the environment where oxygen could be hardly mixed in, and thus, the oxygen content in copper alloy of each sample is 0.002 mass % or less.

In Table 2 and Table 3, bending life was measured by attaching a weight of 20 g to a sample, bending the sample at 90 degrees right and left supporting by the jig with a bending radius of 5 mm, and counted bending times until the sample broke. A set of right and left operations at 90 degrees was counted as one bending.

In Table 2 and Table 3, as you can see from Samples No. 8, No. 13, and No. 14, a plated wire is a copper alloy wire composed of copper alloy including indium of 0.30 mass %, which has a plating layer around. Under the conditions where the plated wire has 0.2 proof stress of 300 MPa or more, and elongation of 7% or more, a good bending life (bending times of 3000 times or more) can be obtained. Especially, when the plated wire is a copper alloy wire which contains indium of 0.3 mass % or more and less than 0.65 mass % and the balance is composed of copper alloy made of copper and unavoidable impurities, or a copper alloy wire which contains indium of 0.3 mass % or more and less than 0.65 mass %, tin of 0.02 mass % or more and less than 0.1 mass %, and the balance is composed of copper alloy made of copper and unavoidable impurities, has a plating layer around, 0.2% proof stress of 300 MPa or more, and elongation of 7% or more, a good bending life (e.g., bending times of 3000 times or more) can be obtained.

Embodiment Example of Plated Wire

As described above, a plated wire can be applied as a center conductor which composes an electric wire or cable shown in FIG. 3 and FIG. 4. In concrete terms, it is an electric wire which has a center conductor made of a plurality of plated wires stranded together and an insulator which covers around the center conductor. Also, the electric wire can be made into a cable by forming a shield layer or a sheath around.

The present invention is not limited to the above-mentioned embodiment or embodiment example, but it can be changed or modified as long as it is not departing from the broad inventive concepts of the invention.

The above-mentioned embodiment includes the following configurations.

[Note 1] A method for manufacturing a copper alloy wire, comprising:
(a) preparing a raw material including copper and additive elements other than coppers;
(b) melting the raw material and casting the molten raw material to form a wire rod;
(c) drawing the wire rod to provide a metal wire;
(d) following the step (c), performing heat treatment on the drawn metal wire;
(e) following the step (d), further drawing the heat-treated metal wire to provide a copper alloy wire with an outer diameter of 0.1 mm or less; and
(f) following the step (e), performing semi-hardening treatment on the meta wire,
wherein the wire rod comprises a copper alloy including indium of 0.3 mass % or more and 0.65 mass % or less.

[Note 2] The method for manufacturing a copper alloy wire, according to Note 1, wherein the copper alloy includes tin of 0.02 mass % or more and less than 0.1 mass %.

[Note 3] The method for manufacturing a copper alloy wire, according to Note 1 or Note 2, wherein, in the step (d), when 0.2% proof stress of the drawn metal wire after the step (c) is A, 0.2% proof stress of the heat-treated metal wire after the step (d) is B, and a ratio C of the 0.2% proof stress values is calculated by an equation C=B/A, the heat treatment is performed in such a manner that the ratio C of the 0.2% proof stress values becomes 0.5 or more and 0.8 or less, and
wherein, when elongation of the drawn metal wire after the step (c) is D, elongation of the heat-treated metal wire after the step (d) is E, and a ratio F of the elongation values is calculated by an equation F=E/D, the heat treatment is performed in such a manner that the ratio F of the elongation values becomes 10 or more and 50 or less,

[Note 4]
The method for manufacturing a copper alloy wire according to Note 3, wherein, in the step (d), the heat treatment is performed in such a manner that electrical conductivity of the metal wire right after the step (d) is 86% IACS or more.

INDUSTRIAL APPLICABILITY

The present invention can be applied to copper alloy wires used inside cables (e.g., extremely fine coaxial cables) for internal wiring parts of compact electronic devices (e.g., digital cameras, surveillance cameras, personal computers, smartphones, or the like), bending-and-twisting-resistant cables (e.g., endoscope cables, probe cables) for industrial robots or medical equipment (e.g., gastro cameras, ultrasonic diagnostic equipment), and cables for vehicles.

The invention claimed is:

1. A copper alloy wire, comprising:
a copper alloy consisting essentially of a Cu—In alloy containing indium of 0.3 mass % or more and 0.65 mass % or less, and the balance Cu and unavoidable impurities, or a Cu—In—Sn alloy containing indium of 0.3 mass % or more and 0.65 mass % or less, tin of 0.02 mass % or more and less than 0.1 mass %, a total content rate of indium and tin being 0.65 mass % or less, and the balance Cu and unavoidable impurities,
wherein the unavoidable impurities included in the Cu—In alloy or the Cu—In—Sn alloy are 20 mass ppm or more and 30 mass ppm or less,
wherein the copper alloy wire comprises 0.2% proof stress of 300 MPa or more and 350 MPa or less, electrical conductivity of 80% IACS or more and 90% IACS or less, and elongation of 7% or more and 18% or less,
wherein the copper alloy wire being subjected to heat treatment conditions, heating at a temperature between 520 and 580 degrees C. and heating time between 0.3 to 0.8 seconds,
wherein the copper alloy wire is obtained by performing a first heat treatment as defined during multiple wire drawing processes and a second heat treatment on a drawn wire obtained in a final wire drawing process after the first heat treatment,
wherein the first heat treatment is performed so that a ratio C of the 0.2% proof stress values becomes 0.5 or more and 0.8 or less, when 0.2% proof stress of the copper alloy wire before heat treatment is A, and 0.2% proof stress of the copper alloy wire after heat treatment is B, the ratio C of the 0.2% proof stress values is calculated by an equation C=B/A,
wherein the second heat treatment is performed at heat temperature of 520° C. or more and 580° C. or less for heating time of 0.3 seconds or more and 0.8 seconds or less, and
wherein a bending life is 3000 times or more.

2. The copper alloy wire according to claim 1, wherein the Cu—In alloy further contains oxygen of 0.002% mass or less and the Cu—In—Sn alloy further contains oxygen of 0.002% mass or less.

3. The copper alloy wire according to claim 1, the bending life being measured by attaching a weight of 20 g to a sample, bending the sample at 90 degrees right and left supporting by a jig with a bending radius of 5 mm, and counting bending times until the sample broke.

4. The copper alloy wire according to claim 1, wherein the unavoidable impurities are aluminum (Al), silicon (Si), phosphorus (P), sulfur(S), chrome (Cr), iron (Fe), nickel (Ni), arsenic (As), selenium (Se), silver (Ag), antimony (Sb), lead (Pb), or bismuth (Bi).

5. A plated wire, comprising:
a copper alloy wire comprising a copper alloy consisting essentially of a Cu—In alloy containing indium of 0.3 mass % or more and 0.65 mass % or less, and the balance Cu and unavoidable impurities, or a Cu—In—Sn alloy containing indium of 0.3 mass % or more and 0.65 mass % or less, tin of 0.02 mass % or more and less than 0.1 mass %, a total content rate of indium and tin being 0.65 mass % or less, and the balance Cu and unavoidable impurities; and
a plating layer formed on an outer periphery of the copper alloy wire,
wherein the unavoidable impurities included in the Cu—In alloy or the Cu—In—Sn alloy are 20 mass ppm or more and 30 mass ppm or less, and
wherein the plated wire comprises the copper alloy wire provided with the plating layer comprises 0.2% proof stress of 300 MPa or more and 350 MPa or less, electrical conductivity of 80% IACS or more and 90% IACS or less, and elongation of 7% or more and 18% or less, wherein an outer diameter of the copper alloy wire is 100 µm or less, and a thickness of the plating layer is 0.1 µm or more and 1.5 µm or less, wherein the copper alloy wire is obtained by performing a first heat treatment as defined during multiple wire drawing processes and a second heat treatment on a drawn wire obtained in a final wire drawing process after the first heat treatment, wherein the first heat treatment is performed so that a ratio C of the 0.2% proof stress values becomes 0.5 or more and 0.8 or less, when 0.2% proof stress of the copper alloy wire before heat treatment is A, and 0.2% proof stress of the copper alloy wire after heat treatment is B, the ratio C of the 0.2% proof stress values is calculated by an equation C=B/A, wherein the second heat treatment is performed at heat temperature of 520° C. or more and 580° C. or less for heating time of 0.3 seconds or more and 0.8 seconds or less, and wherein a bending life is 3000 times or more.

6. The plated wire according to claim 5, wherein the Cu—In alloy further contains oxygen of 0.002% mass or less and the Cu—In—Sn alloy further contains oxygen of 0.002% mass or less.

7. The plated wire according to claim 5, the bending life being measured by attaching a weight of 20 g to a sample, bending the sample at 90 degrees right and left supporting by a jig with a bending radius of 5 mm, and counting bending times until the sample broke.

8. The plated wire according to claim 5, wherein the unavoidable impurities are aluminum (Al), silicon (Si), phosphorus (P), sulfur(S), chrome (Cr), iron (Fe), nickel (Ni), arsenic (As), selenium (Se), silver (Ag), antimony (Sb), lead (Pb), or bismuth (Bi).

9. An electric wire, comprising:
a conductor; and
an insulation coating an outer periphery of the conductor;
wherein the conductor comprising a plated wire comprises a copper alloy wire comprising a copper alloy consisting essentially of a Cu—In alloy containing indium of 0.3 mass % or more and 0.65 mass % or less, and the balance Cu and unavoidable impurities, or a Cu—In—Sn alloy containing indium of 0.3 mass % or more and 0.65 mass % or less, tin of 0.02 mass % or more and less than 0.1 mass %, a total content rate of indium and tin being 0.65 mass % or less, and the balance Cu and unavoidable impurities, wherein the unavoidable impurities included in the Cu—In alloy or the Cu—In—Sn alloy are 20 mass ppm or more and 30 mass ppm or less, and wherein the copper alloy wire provided with a plated layer comprises 0.2% proof stress of 300 MPa or more and 350 MPa or less, electrical conductivity of 80% IACS or more and 90% IACS or less, and elongation of 7% or more and 18% or less, wherein an outer diameter of the copper alloy wire is 100 µm or less, and a thickness of the plating layer is 0.1 µm or more and 1.5 µm or less, wherein the copper alloy wire is obtained by performing a first heat treatment as defined during multiple wire drawing processes and a second heat treatment on a drawn wire obtained in a final wire drawing process after the first heat treatment, wherein the first heat treatment is performed so that a ratio C of the 0.2% proof stress values becomes 0.5 or more and 0.8 or less, when 0.2% proof stress of the copper alloy wire before heat treatment is A, and 0.2% proof stress of the copper alloy wire after heat treatment is B, the ratio C of the 0.2% proof stress values is calculated by an equation C=B/A, wherein the second heat treatment is performed at heat temperature of 520° C. or more and 580° C. or less for heating time of 0.3 seconds or more and 0.8 seconds or less, and wherein a bending life is 3000 times or more.

10. The electric wire according to claim 9, wherein the conductor comprises a plurality of the copper alloy wires being stranded together.

11. A cable, comprising:
a plurality of core wires each comprising the electric wire according to claim 9 including the conductor comprising the plated wire and the insulation coating the outer periphery of the conductor; and
a sheath covering the plurality of core wires collectively.

12. The cable according to claim 11, wherein the elongation is 10% or more and 18% or less.

13. The cable according to claim 11, wherein the Cu—In alloy contains indium of 0.35 mass % or more and 0.65 mass % or less, and the Cu—In—Sn alloy contains indium of 0.35 mass % or more and 0.65 mass % or less.

14. The cable according to claim 11, wherein the Cu—In alloy further contains oxygen of 0.002% mass or less and the Cu—In—Sn alloy further contains oxygen of 0.002% mass or less, and
wherein the copper alloy is devoid of Mg, Ni, and Si.

15. The electric wire according to claim 9, wherein the Cu—In alloy further contains oxygen of 0.002% mass or less and the Cu—In—Sn alloy further contains oxygen of 0.002% mass or less.

16. The electric wire according to claim 9, wherein the unavoidable impurities are aluminum (Al), silicon (Si), phosphorus (P), sulfur(S), chrome (Cr), iron (Fe), nickel (Ni), arsenic (As), selenium (Se), silver (Ag), antimony (Sb), lead (Pb), or bismuth (Bi).

* * * * *